Patented Oct. 2, 1923.

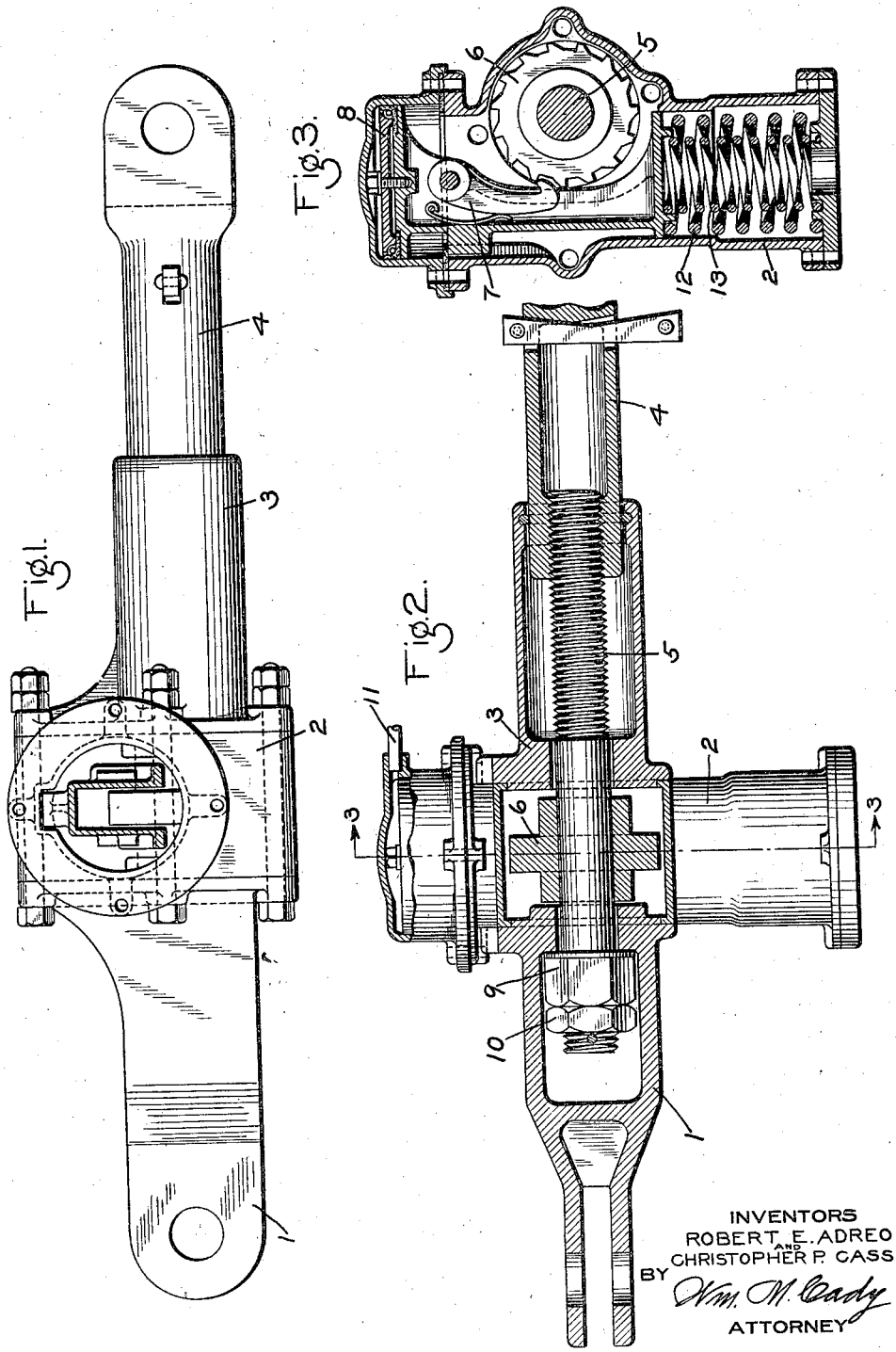

1,469,572

UNITED STATES PATENT OFFICE.

ROBERT E. ADREON, OF ST. LOUIS, MISSOURI, AND CHRISTOPHER P. CASS, OF BERKELEY, CALIFORNIA, ASSIGNORS TO THE AMERICAN BRAKE COMPANY, OF ST. LOUIS, MISSOURI, A CORPORATION OF MISSOURI.

SLACK ADJUSTER.

Application filed July 19, 1922. Serial No. 575,936.

*To all whom it may concern:*

Be it known that we, ROBERT E. ADREON and CHRISTOPHER P. CASS, citizens of the United States, and residents, respectively, of St. Louis, State of Missouri, and Berkeley, in the county of Alameda, State of California, have jointly invented certain new and useful Improvements in Slack Adjusters, of which the following is a specification.

This invention relates to automatic slack adjusters for taking up slack due to the wear of the brake shoes on the car wheels.

The principal object of our invention is to provide a slack adjuster construction comprising members constituting a tie rod between brake levers and including a take-up cylinder, and so constructed as to avoid transmission of brake rod tension through the body casting of the take-up cylinder.

In the accompanying drawing; Fig. 1 is a plan view, with the cover plate removed, of a brake lever tie rod construction with a take-up cylinder embodied therein in accordance with our invention; Fig. 2 is a side elevation thereof, partly in section; and Fig. 3 a section on the line 3—3 of Fig. 2.

The construction may comprise a tie rod member 1 adapted to be connected to one brake lever and having rigidly secured thereto a take-up cylinder 2. Secured to the opposite side of the take-up cylinder 2 is a sleeve member 3, into which a tie rod member 4 telescopes, the member 4 being connected to the other brake lever (not shown). An adjusting screw 5 has screw-threaded engagement with the member 4 and secured to said screw, within the take-up cylinder 2 is a ratchet wheel 6. The ratchet wheel is adapted to be rotated by the operation of a pawl 7 which is pivotally connected to a piston 8, said piston being operated by fluid under pressure supplied from the usual brake cylinder, when the brake cylinder piston travels beyond a predetermined point in applying the brakes.

In order to avoid the transmission of tie rod tension through the body casting of the take-up cylinder, the adjusting screw is extended into a cavity in the member 1 and is provided with screw threads for a nut 9 and jam nut 10, so that when the tie rod is under tension, the stress is transmitted through the adjusting screw 5, to the nut 9 and thence to the member 1, without subjecting the take-up cylinder to stress.

In operation of the slack adjuster, when the brakes are applied and the brake cylinder piston moves beyond a predetermined distance, due to wear of the brake shoes on the wheels, fluid under pressure is admitted from the brake cylinder, through pipe 11 to piston 8, thus operating the pawl 7 so that the pawl engages a succeeding tooth of the ratchet wheel 6. When the brakes are released, fluid is released from the piston 8, and the springs 12 and 13 operate the pawl 7 so as to effect the partial rotation of the ratchet wheel 6 and the corresponding rotation of the screw 5. The member 4 being held against rotation by connection to the brake lever, the screw 5 turns in the member 4 and draws the same longitudinally, so that the tie rod is shortened and the slack corresponding with the brake shoe wear is taken up.

Having now described our invention, what we claim as new and desire to secure by Letters Patent, is:—

1. In a slack adjuster, the combination with a tie rod member, a take-up cylinder fixed thereto, an adjusting screw, and a tie rod member having screw-threaded engagement with said screw, of means for transmitting tension from one tie rod member through the adjusting screw to the other tie rod member.

2. In a slack adjuster, the combination with a tie rod member, a take-up cylinder fixed thereto, an adjusting screw, and a tie rod member having screw-threaded engagement with said screw, of a nut associated with said screw and engaging one tie rod member for transmitting tension stresses from the other tie rod member through the adjusting screw directly to the first mentioned tie rod member.

In testimony whereof we have hereunto set our hands.

ROBERT E. ADREON.
CHRISTOPHER P. CASS.